United States Patent [19]

Currie et al.

[11] 4,327,543
[45] May 4, 1982

[54] AGRICULTURAL MACHINE

[75] Inventors: Ian Currie; Tom McMaster, both of Garvagh, Ireland

[73] Assignee: Archie Kidd Limited, Devizes, England

[21] Appl. No.: 180,978

[22] Filed: Aug. 25, 1980

[30] Foreign Application Priority Data

Aug. 31, 1979 [GB] United Kingdom ............... 7930316

[51] Int. Cl.³ ............................................ A01D 43/02
[52] U.S. Cl. ...................................... 56/344; 56/13.9; 241/262
[58] Field of Search ............ 56/344, 361, 364, DIG. 1, 56/DIG. 17, 293, 13.6, 13.7, 13.8, 13.9; 83/437, 569, 566, 620; 241/262

[56] References Cited

U.S. PATENT DOCUMENTS

| | | | |
|---|---|---|---|
| 2,039,457 | 5/1936 | Schober | 83/569 |
| 3,491,523 | 1/1970 | Bornzin | 56/13.9 |
| 3,530,650 | 9/1970 | Phillips | 56/13.9 |
| 3,745,754 | 7/1973 | Growberg | 56/364 |

FOREIGN PATENT DOCUMENTS 232866 4/1964 Fed. Rep. of Germany ........ 56/361

*Primary Examiner*—Robert A. Hafer
*Attorney, Agent, or Firm*—Stanley C. Spooner

[57] ABSTRACT

An agricultural machine for picking up and chopping crop, particularly green crop such as grass to be made into silage, and comprising a picking up device for collecting crop from ground over which the machine is travelling and at least one chamber to which the crop is delivered from said picking up device through a lateral opening and the chamber containing a reciprocable ram movable towards and away from stationary knives in an open end of the chamber, the ram preferably having knives on its face presented towards the stationary knives, the movement of the ram towards the stationary knives causing the knives to co-operate to chop up the crop, the cut crop being discharged from the open end of the chamber into a collector cage.

28 Claims, 4 Drawing Figures

AGRICULTURAL MACHINE

BACKGROUND OF THE INVENTION

This invention relates to an agricultural machine for picking up from a field and chopping a crop such as grass which has been previously cut. The machine, which may be a trailer has provision for picking up the previously cut crop and for chopping it up and it also has a container in which the crop is collected.

Such a machine has particular utility in relation to a green crop, that is a crop which has not been allowed to dry, after cutting, to any great extent and which is therefore suitable for the making of silage.

Agricultural machines for dry crop harvesting are known in which a dry crop, such as weather dried straw or hay, lying on the ground is picked up by a suitable device and passed to a conveyor means arranged generally above the picking up device and transverse to the direction of travel, the crop then being fed by the transverse conveyor to a baler unit which generally extends longitudinally of the machine. Usually there is only one baler unit at one side of the machine though baler units may be placed at each side of the machine, the transverse conveyor being arranged to distribute the crop to both sides, that is from the centre outwards to each baler unit. The dry crop is tied into bales and then discharged or fed to a collecting unit. Such machines are made specifically for dry crop harvesting. Green crop is not normally baled in this way and requires to be chopped up into short lengths. For silage it is stored in silos or other airtight chambers in a loose state.

SUMMARY OF THE INVENTION

It is an object of the present invention to provide an agricultural machine for picking up, chopping and collecting crop, particularly green crop in an efficient and economical manner.

According to the present invention, there is provided an agricultural machine for picking up and chopping crop comprising a device for picking up crop from ground over which the machine is travelling, in use, at least one chamber to which the crop is delivered from said picking up device characterised in that, the chamber or each chamber has an entry opening and a discharge open end, and stationary knives in or near said discharge open end and the or each chamber containing a reciprocable ram movable from a position in which crop can enter the chamber through the entry opening towards the stationary knives, to chop the crop up and a collector into which the crop is discharged from the open end of the chamber or each chamber.

According to a further aspect of the invention there is provided an agricultural machine for picking up and chopping crop comprising a device for picking up crop from ground over which the machine is travelling, in use, at least one chamber to which the crop is delivered from said picking up device, characterised in that the chamber or each chamber has an entry opening and a discharge open end, and stationary knives in or near said discharge open end and the or each chamber containing a reciprocable ram with knives on its face present towards and co-operable with stationary knives in the chamber, to chop up crop which can enter the chamber through the entry opening from the picking up device, the crop being cut between the knives on the ram and the stationary knives when the ram is moved towards the stationary knives, and a collector into which the crop is discharged from the open end of the chamber or each chamber.

BRIEF DESCRIPTION OF THE DRAWINGS

One embodiment of the present invention will now be described, by way of example, with reference to the accompanying drawings, in which.

DETAILED DESCRIPTION OF PREFERRED EMBODIMENT

Figure 2:
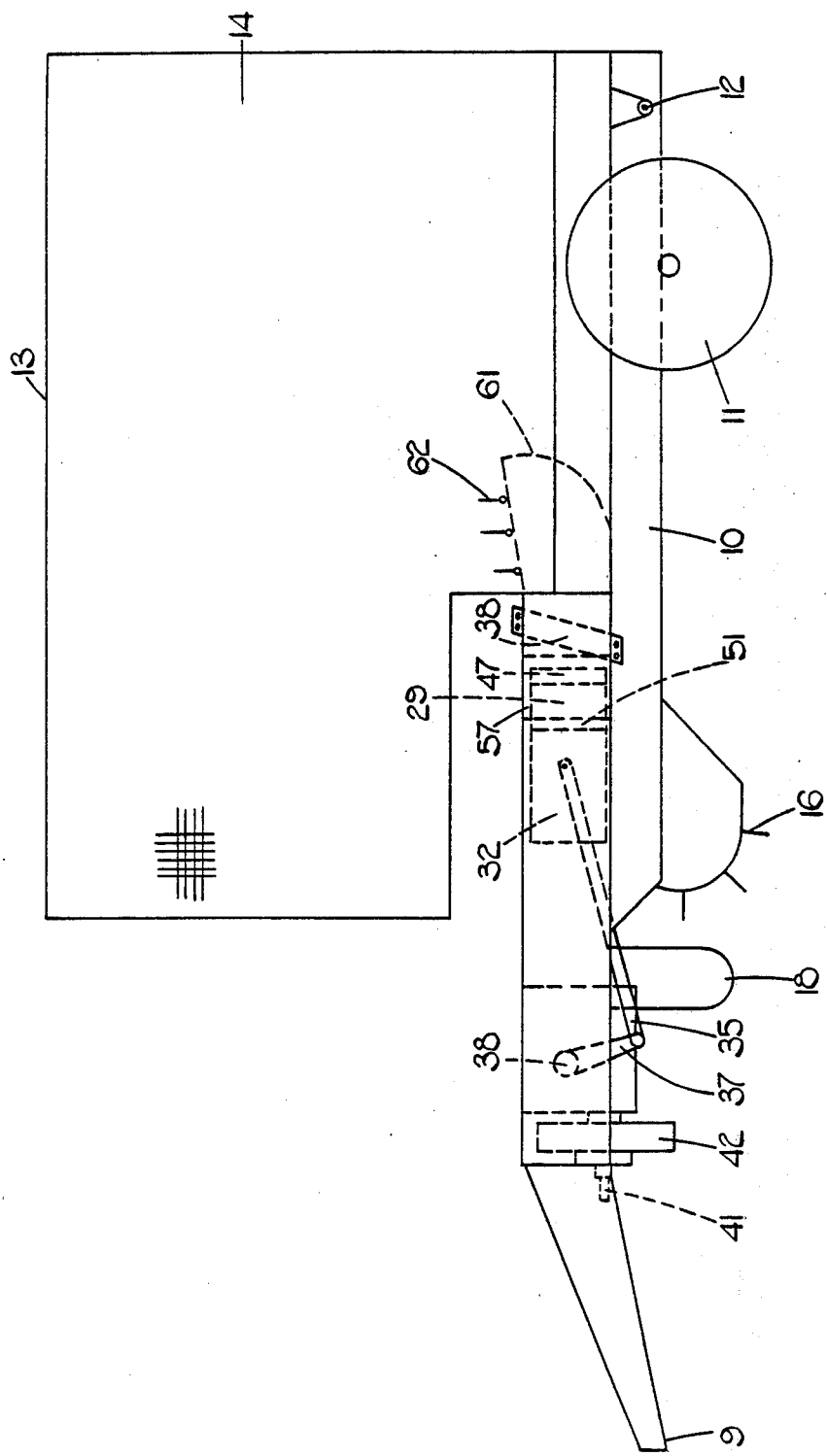
FIG. 2 is a diagrammatic side elevation view thereof.

Referring to the drawings, an agricultural machine for picking up and chopping particularly previously cut green crop is in the form of a wheeled trailer having a tow bar 9 and intended to be towed behind a tractor or other traction unit. The machine has a chassis, to the forward end of which the tow bar 9 is attached. The chassis, which includes two interconnected longitudinal members, one of which is shown at 10 in FIG. 2, to which an axle carrying road wheels 11 is fixed.

Figure 1:
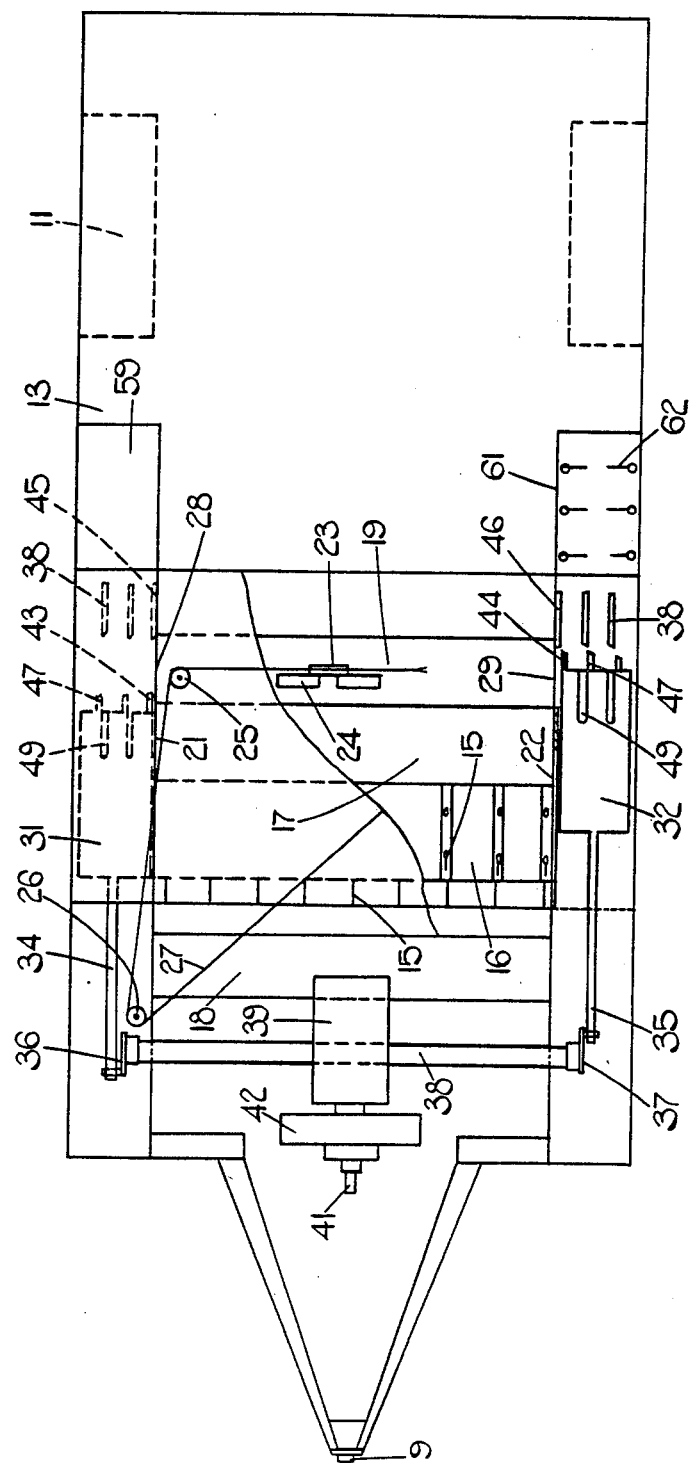
FIG. 1 is a diagrammatic plan view of an agricultural machine constructed according to the present invention.

Also connected to these members 10 and normally resting on them is a collector cage 13 made of steel wire mesh on a steel frame. This is pivoted to the chassis members 10 at 12 and can be tipped to discharge the contents through a rear opening door 14. An hydraulic or other unit (not shown) is provided for actuating the tipping of the collector cage 13. Mounted on the chassis are two elongated tubular chambers made from sheet metal. In the centre of the chassis is a crop picking up device extending transversely of the direction of travel. This is in the form of a conventional tined rotary reel, with spaced radial tines 15 being rotated in a clockwise direction as viewed in FIG. 2, from a lower pick up station towards an upper discharge station. A slotted guard 16 is provided to accept the crop from the tines 15 and this has an inclined platform 17 over which the crop travels as more crop is pushed onto the guard 16. In front of the picking up device is a fixed generally U shaped baffle 18 extending across the front but spaced from the picking up device and extends downwardly towards the ground serving to flatten the cut material against the ground prior to being picked up by the tines 15 of the reel. The baffle 18 is shown in FIG. 1 in the form of a U shaped flexible sheet but may, in a simplified form, be a sheet of flexible material whose lower edge is bent rearwardly.

Behind the inclined platform 17 is a flat feeder floor 19 which extends to the two internally oppositely presented walls 21, 22 of the tubular chambers. There is suspended over this feeder floor 19 a trolley 23 with a pair of rake members 24 suspended from it. The crop arriving on the feeder floor 19 from the inclined platform 17 is taken to the two opposite ends of the floor in turn by reciprocation of the trolley along rails (not shown). To drive the trolley there is a system of sprockets 25, 26 and chain 27 carried on the pulleys and connected to the trolley 23. The drive comes to the sprockets 26 in a manner which will be described later. In another form, there are two of the trolleys arranged to travel in opposite directions. Pulleys and wire rope or other transmission arrangement may be used in place of the sprockets and chain.

The two chambers extend along about half the chassis length and are formed of sheet metal. Towards the front of the machine they are of square section but open topped as well as partly open below but in the mid-portion and to the rear, each chamber is of square, or rectangular section having two side walls, a top and a bottom wall. The rear end of each chamber is open. The side walls already referred to as internally opposite walls 21, 22 have respective rectangular openings 28, 29.

Figure 4:
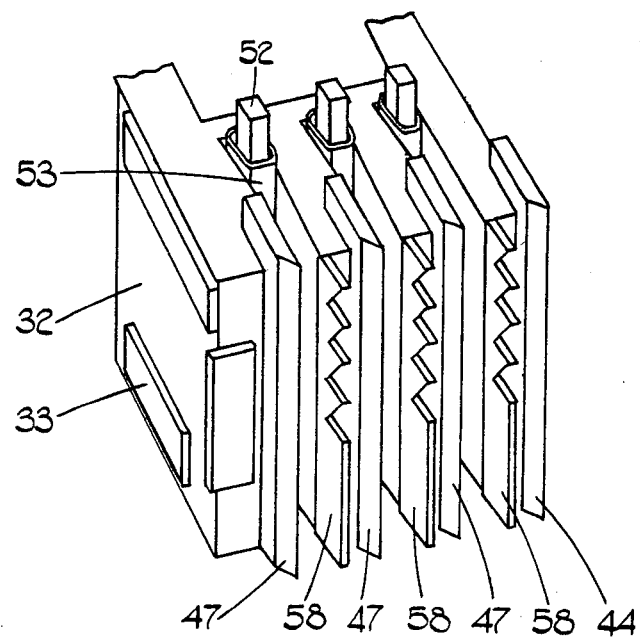
FIG. 4 is a perspective view of the ram in this section.

Each chamber contains a longitudinally slidable ram 31, 32 engaged on anti-friction slides (not shown) in the interior of the chamber. FIG. 4 shows anit-friction pads 33 on the sides of the ram. Alternatively the ram may be mounted on rollers.

To drive the rams lengthwise of the chambers, each has a pivotally connected rod 34, 35 which is connected at its other end to a crank 36, 37. The cranks 36, 37 are mounted at opposite ends of a transverse drive shaft 38 spaced forwardly of the baffle 18. The cranks 36, 37 are arranged at 180° relative to each other so that when one ram 31 is at maximum forward position, the other ram 32 is at maximum rearward position. Rotary motion is transmitted to the drive shaft 38 through a gear box 39 having an input shaft 41 on which is mounted a fly wheel 42. This system includes a sheer bolt or other connection guarding against damage. The shaft 41 is connectable to the power take off shaft of the tractor or other traction unit to provide power input to the machine. The sprocket 26 for the chain drive to the trolley 23 above the feeder floor 19 is driven from the shaft 38 at the end carrying the crank 36, by a suitable right angle drive. The edge of the front face of each ram 31, 32 adjacent to the inner side of the chamber carries a knife blade 43, 44. The edge of the opening 21 or 22 inner side of each chamber also carries a knife 45, 46. The knives 43, 45 and 44, 46 co-act together as a guillotine to cut off the crop material entering the chambers from the feeder floor 19.

The knife 43 or 44 on the edge of the front edge of the ram 31 or 32 is upright and the knife 45, 46 at the edge of the opening 28, 29 is fixed but the cutting edge is upwardly inclined from bottom to top in the rearward direction from the arm. The leading face of the rams 31, 32 carry two or more further knives 47. Within the open rear end of the chambers are respective fixed inclined knives 48 co-operating with the ram knives 47 respectively, as guillotines.

The knives 47 on the leading face of the rams are mounted in respective sides of slots 49 arranged in parallel and upright in the ram face, as shown in FIG. 4. These slots 49 are arranged to accommodate the knives 38 when the rams are in their rearward positions.

Figure 3:
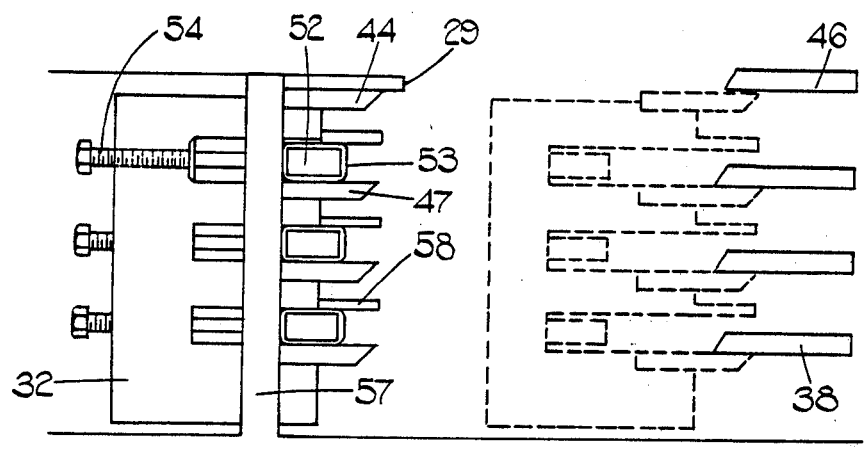
FIG. 3 is a plan view, on an enlarged scale of the chopping section of the machine.

Each slot 49 contains an ejector 51. Each ejector 51 comprises a rectangular bar 52 encased in a metal sleeve 53 which is frictionally engaged in the slot. To each ejector is attached a piston rod 54 engaged in the rear wall of the slot. The rod 54 is enclosed in a coiled compression spring 55 and abutting against a nut 56 on the rod end. The spring is arranged to bias said ejector to the back or closed end of the slot. Carried within the chamber is a transverse bar 57 shown in FIGS. 2 and 3. As the ram 31 or 32 moves to its forward position in the machine, the ejectors 51 contact the bar 57 and are driven along the respective slots to clear them of compressed crop. On each return stroke, the springs 55 return the ejectors 51 to their positions at the backs of the slots.

On the opposite side of each slot from the knives 47 are respective vertically mounted crop retainer bars 58 with large tooth formations on their leading edges. The tooth formations serve to tend to prevent crop sliding along the knives, instead of being cut by them. These are seen in FIG. 4.

An upwardly discharging deflector 59, 61 is mounted at the outlet rear open end of each chamber to discharge into the collector cage 13.

To prevent chopped green crop falling through the openings in the bottom of the collector cage 13 through which the crop enters from the deflectors 59, 61 when the collector cage 13 is tipped up, the openings are provided with hinged fingers 62 at the sides of the openings, each having spring biasing to bring them down to generally horizontal positions. These however only come down across the openings when the collector cage 13 is tipped and are normally held in vertical positions when the cage is down on the deflectors 59, 61.

In use, the agricultural machine is hitched to a tractor and shaft 41 is connected to the power take off shaft of the tractor and with the tines 15 rotating, the machine is towed across a field on which cut green crop such as grass, to be used as silage, lies. The baffle 18 flattens the grass which is then picked up by the tines 15 and delivered onto the feeder floor 19 where the rake members 24 feed the cut grass through the openings 28, 29 into the respective chambers. The rams 31, 32 cut off the flow of cut grass and the knives 43, 45 and 44, 46 chop the cut grass lying across the openings 28, 29. Simultaneously, the knives 38, 47 chop the cut grass in a sheering movement in the chamber into small lengths by compressing the material against stationary knives 38. The material is forced into the collector cage 13 by the action of the rams continually feeding more material through the deflectors 59, 61. The material flows over the tops of the deflectors and spreads across the floor of the collector cage 13 to fill the collector cage generally evenly.

The above-described machine has two parallel chambers however the machine may have only one chamber.

In a modification, each deflector 59, 61 is provided with an upright tubular extension with a downward deflector at its upper end whereby the material is fed into the collector cage from above, the shape of the collector cage being modified to accommodate these upright tubular extensions.

In a further modification, the baffle 18 is replaced by a ground engaging roller which also serves as a depth adjustment mechanism for the pick-up means. The machine may be self-propelled. The cutting edges of the knives may be upright. In this case, the retainer bars 58 are not essential though they are preferable.

We claim:

1. An agricultural machine for picking up and chopping crop comprising:
   a device for picking up crop from ground over which the machine is travelling;
   at least one chamber to which the crop is delivered from said picking up device, said chamber having an entry opening and a discharge opening;
   stationary knives are mounted near said discharge opening;
   a reciprocable ram in said chamber movable from a position in which crop can enter the chamber through the entry opening to a position towards the stationary knives, said chamber, knives and ram comprising a means for chopping the crop up; and a collector into which the crop is discharged from the discharge opening of the chamber.

2. An agricultural machine as claimed in claim 1 wherein said machine is in the form of a trailer including power means for actuating the picking up device and said ram.

3. An agricultural machine as claimed in claim 2 wherein the power means is a drive connectable to a power take off shaft of a vehicle for towing the machine.

4. An agricultural machine as claimed in any one of the preceding claims wherein the entry opening in the chamber is disposed laterially of the length of the chamber.

5. An agricultural machine as claimed in claim 1 wherein there are two chambers arranged in parallel at the sides of the machine, the picking up device being situated between the chambers and means being provided for delivering the crop into respective entry openings in the chambers, which are disposed laterally of the lengths of the chambers.

6. An agricultural machine as claimed in claim 1 wherein said collector is mounted on a chassis of the trailer said machine including means for tipping said collector relative to the chassis to discharge the contents.

7. An agricultural machine as claimed in claim 6 wherein said collector includes a rear door which can be opened to permit discharge of the contents of the collector when tipped.

8. An agricultural machine as claimed in claim 6 including a deflector by means of which the chamber communicates with the collector, the deflector being arranged to discharge the crop through an entry opening into the collector from below the collector; the deflector having non return means, adjacent to said collector entry opening, for preventing said crop from falling out of said collector entry opening when said collector is tipped.

9. An agricultural machine as claimed in claim 1 wherein said picking up device comprises:
a rotary member carrying tines arranged to pick up crop from the ground;
and plate means onto which the crop is deposited from the tines.

10. An agricultural machine as claimed in claim 9 including a deflector arranged ahead of the picking up device and arranged to flatten the crop on the ground.

11. An agricultural machine as claimed in claim 1, wherein said machine includes a feeder floor and said picking up device delivers the crop onto a feeder floor, said machine further includes a reciprocable member arranged to deliver the crop on said feeder floor to the entry opening of said chamber.

12. An agricultural machine as claimed in claim 11 further including a drive mechanism for driving said reciprocable member in unison with the reciprocation of the ram.

13. An agricultural machine as claimed in claim 1, further comprising crank mechanism means for imparting reciprocatory movement to the ram from a rotary drive.

14. An agricultural machine as claimed in claim 1 wherein said ram has a face presented towards the stationary knives, said face includes knives which co-operate with the stationary knives, at the end of the stroke of the ram, to cut the crop.

15. An agricultural machine as claimed in claim 14 wherein said ram face includes slots for accommodating the stationary knives at the end of the stroke of the ram, said face knives are mounted at the sides of respective slots.

16. An agricultural machine as claimed in claim 15, wherein ejectors are provided partially occupying the respective slots.

17. An agricultural machine as claimed in claim 16, wherein each ejector having a width approximately equal to that of the slot which it occupies, is movable along the length of the slot as the ram reciprocates, and a fixed bar which contacts the ejectors to move them against biasing means towards said fixed knives to clear compacted crop from the slots.

18. An agricultural machine as claimed in claim 3 wherein a knife is provided at one edge of said ram adjacent to the lateral entry opening, said knife co-operating with a further knife located at one edge of the entry opening, to cut off the supply of crop through the entry opening as the ram reciprocates.

19. An agricultural machine as claimed in one of claims 14, 15 or 16 wherein the knives are inclined to the direction of travel of the ram.

20. An agricultural machine as claimed in claim 14, wherein said knives are inclined to the direction of travel of the ram and a crop retaining member is provided adjacent to the knives at the face of the ram to resist movement of the crop along the lengths of the inclined knives, as the ram moves towards the stationary knives.

21. An agricultural machine for picking up and chopping crop comprising:
a device for picking up crop from ground over which the machine is travelling;
at least oen chamber to which the crop is delivered from said picking up device, said chamber having an entry opening and a discharge opening;
stationary knives, said knives mounted near said discharge opening;
a reciprocable ram in said chamber, said ram having knives on a face presented towards said discharge opening, said stationary knives mounted in the chamber and co-operable with said ram knives to chop up crop which can enter the chamber through the entry opening from the picking up device, the crop being cut between the knives on the ram and the stationary knives when the ram is moved towards the stationary knives; and
a collector into which the crop is discharged from the open end of the chamber.

22. An agricultural machine as claimed in claim 21 wherein the entry opening to the chamber is disposed laterally of the length of the chamber.

23. An agricultural machine as claimed in claim 21 or claim 22 wherein said ram includes slots and the knives on the ram are disposed at the sides of respective slots to accommodate the stationary knives at the end of the stroke of the ram.

24. An agricultural machine as claimed in claim 23 further including ejectors occupying the respective slots.

25. An agricultural machine as claimed in claim 23 wherein ejectors occupy positions in respective slots, each ejector having a width approximately equal to that of the slot which is occupies, a fixed bar for moving the ejector along the length of the slot as the ram reciprocates, said bar contacting the ejectors to move them against biasing means towards the entry ends of their slots, said ejectors comprising a means for clearing compacted crop from the slots.

26. An agricultural machine as claimed in claim 22 wherein said ram includes a knife adjacent to the lateral entry opening of said chamber, said knife co-operating with a knife formed at one edge of the entry opening to comprise a means for cutting off the supply of crop through the entry opening as the ram reciprocates.

27. An agricultural machine as claimed in claim 11, wherein knives are inclined to the direction of travel of the ram.

28. An agricultural machine as claimed in claim 27 further including crop retaining members, located adjacent to the knives at the face of the rams, for resisting movement of the crop along the lengths of the inclined knives as the ram moves towards the stationary knives.

* * * * *